United States Patent
Smith et al.

(10) Patent No.: US 6,600,530 B1
(45) Date of Patent: Jul. 29, 2003

(54) DISPLAY MODULE

(75) Inventors: Thomas W. Smith, Lewisville, TX (US); Hannu Rissanen, Irving, TX (US); Corrine Anne Raherimanjato, Arlington, TX (US)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/465,685

(22) Filed: Dec. 17, 1999

(51) Int. Cl.⁷ .............................................. G02F 1/1335
(52) U.S. Cl. ............................ 349/98; 29/883; 368/88
(58) Field of Search ............................ 349/98; 29/883; 368/88

(56) References Cited

U.S. PATENT DOCUMENTS 3,861,135 A * 1/1975 Seeger et al. ................. 368/88
3,991,463 A * 11/1976 Squitieri et al. ............... 29/883

* cited by examiner

Primary Examiner—Kenneth Parker
Assistant Examiner—David Chung
(74) Attorney, Agent, or Firm—Thomas B. Hayes

(57) ABSTRACT

A display module comprising a display assembly bonded to a substrate. The display assembly comprises a first side for displaying visual information and a second side. The second side comprises a first area having an adhesive layer and a second area having a through connection to a conductive pad. The substrate comprises a first side for receiving the display assembly. The first side comprises a first surface area for bonding to the adhesive layer and a second surface area comprising an electrode pad having multiple electrodes for receiving electrical signals. A conductive elastomer is positioned within the through connection establishing conductive continuity between the conductive pad and the electrode pad when the display assembly is bonded to the substrate.

6 Claims, 2 Drawing Sheets

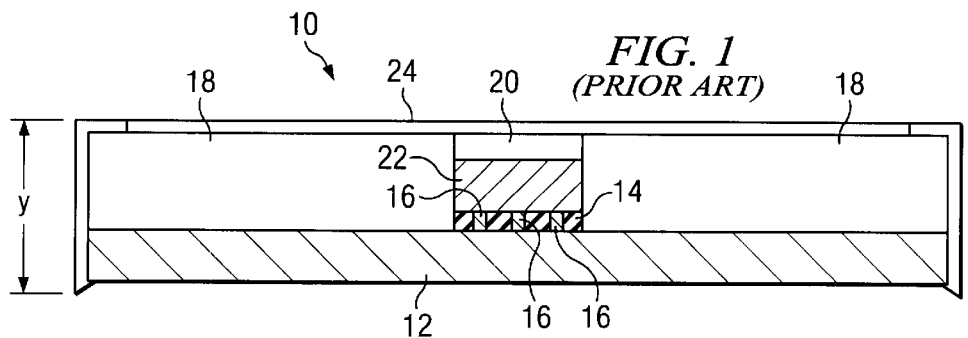
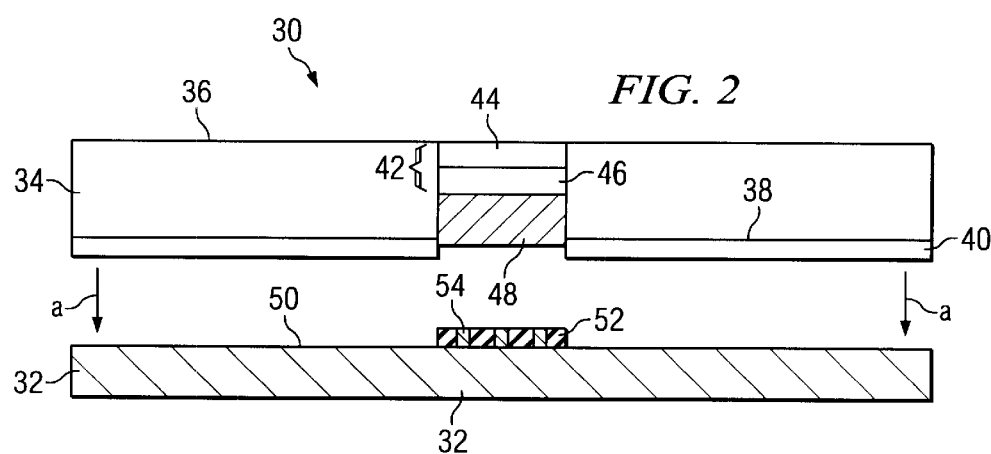
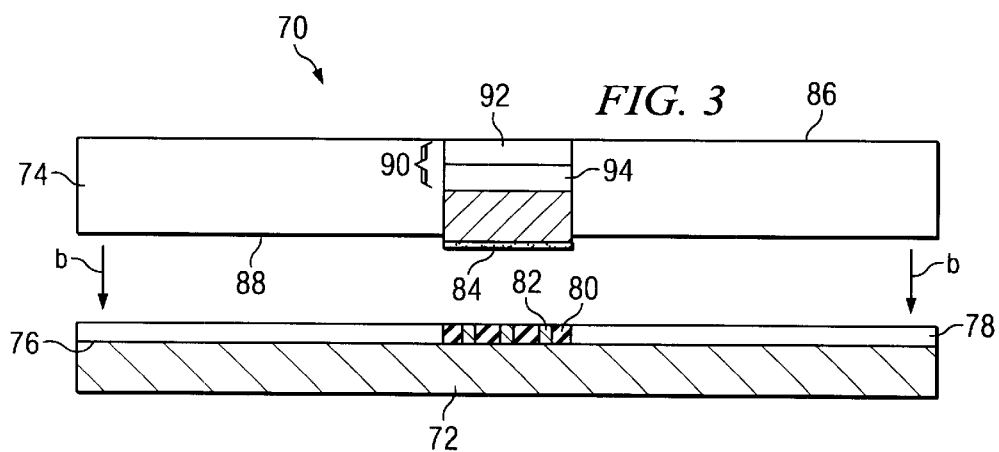

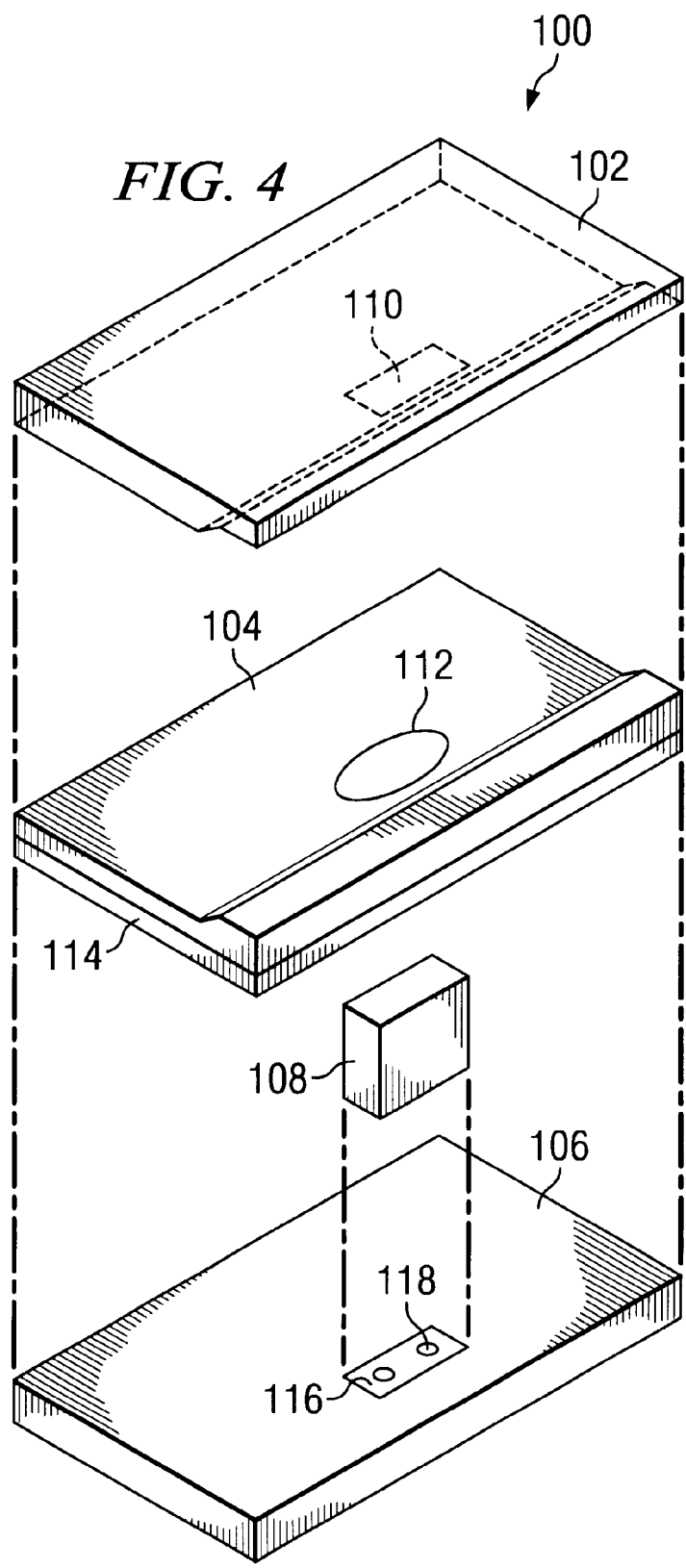

DISPLAY MODULE

FIELD OF THE INVENTION

The present invention relates, in general, to display modules and, in particular, to a method and apparatus for improving continuity between a substrate and a display assembly.

BACKGROUND OF THE INVENTION

Without limiting the scope of the invention, its background is described in connection with display modules used in mobile phones.

Typically in Liquid Crystal Display (LCD) devices a contact is made between a conductive pad located on an LCD and electrodes located on an LCD driver. For example, a semiconductor device, such as a Printed Circuit Board (PCB), uses a conductive elastomer interconnect. A steel frame is used to adhere the LCD and the LCD driver in a position that allows for minimum resistance between the conductive pad and the electrodes through the conductive elastomer interconnect. Variations in the position of the LCD and the LCD driver may create a discontinuity resulting in an increase in resistance across the conductive path. An increase in resistance across the conductive path affects the quality of the display.

Reference is now made to FIG. 1, where a prior art display module is illustrated and denoted generally as 10. Display module 10 comprises a substrate 12 having a electrode pad 14 comprising multiple electrodes 16 and a display assembly 18 having a conductive pad 20. A conductive elastomer 22 is positioned between electrode pad 14 and conductive pad 20. A steel frame 24 is used to secure substrate 12 to display assembly 18 and to maintain the integrity of the electrical connection between electrode pad 14 and conductive pad 20.

Substrate 12 is an electronic component, for example, a Printed Circuit Board (PCB), used to drive display assembly 18. Substrate 12 comprises electrode pad 14 having several electrodes 16 for receiving and transmitting electrical signals. Electrodes 16 may be formed from copper, gold-nickel plated copper or other similar materials. Display assembly 18, which may be an LCD for displaying visual information, includes conductive pad 20 formed of a transparent conductive film such as Indium-Tin Oxide (ITO). Conductive elastomer 22 is a flexible material comprising a plurality of flexible conductive wires. Conductive elastomer 22 interposed between electrode pad 14 and conductive pad 20 creates a conductive path between display assembly 18 and substrate 12.

The manufacture of steel frame 24 allows for a minimal y-axis variation. Variations in the steel frames y-axis may create a discontinuity or increase resistance across the conductive path formed by electrode pad 14, conductive pad 20 and conductive elastomer 22. Product use, for example, as a result of typical wear and tear, may also increase y-axis variations causing a further decrease in the quality of the electrical connection. In order to maintain a strong connection between electrode pad 14 and conductive pad 20, steel frame 24 must maintain a compression between 10% to 30% of elastomer 22.

As may be seen, therefore, an improved apparatus that eliminates y-axis variation in a display module used in mobile phones could provide a commercially useful article and improve the quality of the display module.

SUMMARY OF THE INVENTION

The present invention presents a display module exhibiting improved continuity between a conductive pad located on a display assembly and an electrode pad located on a substrate.

A display module is presented comprising a display assembly having a first side for displaying visual information and a second side. The second side comprises a first area having an adhesive layer and a second area having a through connection to a conductive pad. The display module further comprises a substrate having a first side for receiving the display assembly, wherein the first side comprises a first surface area for bonding to the adhesive layer and a second surface area comprising an electrode pad having multiple electrodes for receiving electrical signals. The display module further comprises a conductive elastomer positioned within the through connection. The conductive elastomer establishes conductive continuity between the conductive pad and the electrode pad when the display assembly is bonded to the substrate.

BRIEF DESCRIPTION OF THE DRAWINGS

For a more complete understanding of the present invention, including its features and advantages, reference is now made to the detailed description of the invention, taken in conjunction with the accompanying drawings of which:

FIG. 1 is a cross-sectional view of a prior art display module using conventional techniques to secure connection between the display assembly and the substrate;

FIG. 2 is a cross-sectional view of a display module according to an embodiment of the present invention;

FIG. 3 is a cross-sectional view of a display module according to an alternative embodiment of the present invention; and FIG. 4 is an exploded perspective view of another embodiment of the present invention.

DETAILED DESCRIPTION OF THE INVENTION

While the making and using of particular embodiments of the present invention are presented in detail below, it will be understood that the present invention provides many applicable inventive concepts, which can be embodied in a wide variety of specific contexts. The specific embodiments discussed herein are merely illustrative of specific ways to make and use the invention and do not limit the scope of the invention.

Referring now to FIG. 2, therein an exploded view of a display module according to an embodiment of the present invention is illustrated and denoted generally as 30. Display module 30 comprises a substrate 32 that is bonded to a display assembly 34 as shown by arrows a. Display assembly 34 comprises a first side 36 for displaying visual information and a second side 38 for attaching to substrate 32. Second side 38 further comprises a first surface area having an adhesive layer 40 and a second surface area comprising a conductive layer 42.

Conductive layer 42 comprises a conductive pad 44 and a gold layer 46. Conductive pad 44, which may be formed from a metal oxide transparent conductive film such as Indium-Tin Oxide (ITO), may have a gold layer 46 deposited on the surface of conductive pad 44 to reduce the contact resistance over a broad range of compressions or y-axis variations. A decrease in compression results in an increase in resistance across the conductive path, which affects the quality of the visual information displayed. Gold layer 46 deposited on the ITO contacts may reduce resistance to approximately zero compared to 20–40 ohms with standard ITO contacts.

A conductive elastomer 48 positioned in place by a through connection, not shown in FIG. 2, establishes a conductive path between substrate 32 and display assembly 34. Adhesive layer 40 deposited on a surface area of the second side 38 bonds display assembly 34 to substrate 32. Adhesive layer 40 may be a reflector paper such as Mylar having double sided adhesive. Steel frame 24, as illustrated in the prior art FIG. 1, is eliminated resulting in a decrease in the number of parts for display module 30 and a decrease in y-axis variations.

Substrate 32, which may be a Printed Circuit Board (PCB), comprises a first side 50 for receiving display assembly 34. The first side comprises a first surface area for receiving display assembly 34 and a second surface area comprising an electrode pad 52. Electrode pad 52 includes multiple electrodes 54 for sending and receiving electrical signals. Electrodes 54 may also have a gold layer to reduce contact resistance over a broad range of compressions. The use of a gold layer will increase metal-to-metal contact between electrodes 44 and the conductive wires of conductive elastomer 48 and result in a very low resistance between conductive elastomer 48 and substrate 32.

By depositing gold layer 46 on conductive pad 44, the compression requirements as described with reference to FIG. 1 may be extended from between 10% to 30% of elastomer 48 to a range between 1% to 30% of elastomer 48. Elastomer 48 will relax compression over time, especially at temperatures over 40 degrees Celsius. By ensuring the quality of the connection over a greater range of compression, the performance of the device can be maintained over a greater period of time than that previously experienced with prior art devices, such as the prior art device illustrated in FIG. 1.

Turning now to FIG. 3, therein a cross-sectional view of an alternative embodiment of the display module is illustrated and denoted generally as 70. Display module 70 comprises a substrate 72 that is coupled to a display assembly 74, as shown by arrows b. Substrate 72, which may be a Printed Circuit Board (PCB) for driving display assembly, comprises a first side 76 for receiving display assembly 74. First side 76 comprises a first surface area having an adhesive layer 78 and a second surface area having an electrode pad 80.

Adhesive layer 78 deposited on the first surface area of substrate 72 fixes display assembly 74 to the substrate surface. Adhesive layer 78 may be a reflector paper such as Mylar having double sided adhesive. Electrode pad 80 includes multiple electrodes 82 for transmitting and receiving electrical signals. Electrodes 82 may have a gold layer to reduce contact resistance over a broad range of compressions. The use of a gold layer will improve metal-to-metal contact between electrodes 82 and the conductive wires of elastomer 84 and results in a very low contact resistance.

Display assembly 74 comprises a first side 86 for displaying visual information and a second side 88 for attaching to substrate 72. Second side 88 further comprises a first surface area for receiving first side 76 having adhesive layer 78 and a second surface area having a conductive layer 90. Conductive layer 90 comprises a conductive pad 92 and a gold layer 94.

Conductive pad 92, which may be formed from a metal oxide transparent conductive film such as Indium-Tin Oxide (ITO), may have gold layer 94 deposited on the surface of conductive pad 92 to reduce the contact resistance over a broad range of compressions or y-axis variations. A gold layer deposited on conductive pad 92 may reduce resistance to approximately zero compared with 20–40 ohms of standard ITO contact pads. Conductive elastomer 84 is positioned in place by a through connection, not shown in FIG. 3, establishing an interconnection between substrate 72 and display assembly 74.

By depositing gold layer 94 on conductive pad 92, the compression requirements as described with reference to FIG. 1 may be extended from between 10% to 30% of elastomer 84 to a range between 1% to 30% of elastomer 84. Elastomer 84 will relax compression over time, especially at temperatures over 40 degrees Celsius. By ensuring the quality of the connection over a greater range of compression, the performance of the device can be maintained over a greater period of time than that previously experienced with prior art devices, such as the prior art device illustrated in FIG. 1.

Turning now to FIG. 4, therein another embodiment of a display module in accordance with the invention is illustrated and denoted generally as 100. Display module 100 is typical of display modules found in mobile phones. Display module 100 comprises a Liquid Crystal Display (LCD) 102 or an equivalent display type for displaying visual information, a light guide 104, an LCD driver 106, and a conductive elastomer 108. LCD 102 and light guide 104 form a display assembly. LCD driver forms the substrate upon which the display assembly formed of LCD 102 and light guide 104 are bonded.

LCD 102 comprises a conductive layer 110 having an Indium-Tin Oxide (ITO) conductive pad and a gold layer deposited on the conductive pad. Light guide 104 comprises a through connection 112 having preferably a round configuration where conductive elastomer 108 when positioned in the through connection 112 expands and makes contact with conductive layer 110. An adhesive layer 114 is applied to the bottom of cover plate 104 bonding cover plate 104 to LCD driver 106. LCD driver 106 comprises an electrode pad 116 comprising several electrodes 118. The assembled display module 100 establishes a reliable electrical connection between LCD driver 106 and LCD 102 reducing discontinuity in the electrical connection by eliminating the part count and decreasing contact resistance.

While this invention has been described with reference to particular embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

What is claimed is:

1. A display module comprising:
    a display assembly comprising a first side for displaying visual information, a conductive pad, and a second side, the second side comprising a first area having an adhesive layer and a second area having a connection to said conductive pad;
    a substrate having a first side having a first area comprising semi-conductive devices for driving the display assembly and a second area for receiving the display assembly, wherein the second area includes a first surface space for bonding to the adhesive layer and a second surface space comprising an electrode pad having multiple electrodes physically coupled to the semi-conductive devices; and
    a conductive elastomer positioned within the connection, the conductive elastomer establishing conductive continuity between the conductive pad and the electrode pad when the display assembly is bonded to the substrate.

2. The display module as recited in claim 1, wherein the conductive pad is formed of an Indium-Tim Oxide layer, and the conductive pad further comprises a gold layer disposed on the Indium-Tin Oxide layer.

3. A display module comprising:
- a display having a front plane for displaying visual information and a back plane having a conductive pad;
- a light guide having a first side for coupling to the back plane and a second side having a connection directly above the conductive pad, the light guide further comprising a connection directly above the conductive pad;
- a conductive elastomer disposed in the connection and in contact with the conductive pad;
- a substrate having a first area comprising semi-conductive devices and a second area comprising an electrode pad with a plurality of electrodes physically coupled to the semi-conductive devices and a surface space specifically for receiving the light guide; and
- an adhesive layer deposited on the second side of the light guide, the adhesive layer for bonding the display assembly to the surface space of the substrate, wherein the display and the light guide are bonded to the first surface area of the substrate creating continuity between the electrode pad and the conductive pad.

4. The display module as recited in claim 1, wherein the conductive pad if formed of an Indium-Tin Oxide layer deposited on the back plane of the display, and wherein the conductive pad comprises a gold layer deposited on the Indium-Tin Oxide layer.

5. A display module comprising:
- a display assembly having a display, a light guide, a front plane for displaying visual information and a back plane having a conductive pad, wherein the light guide has a first side disposed on the back plane, and the light guide further comprises a connection directly above the conductive pad;
- a substrate having a first area comprising semi-conductive devices for driving the display assembly and a second are comprising a first surface space for receiving the display assembly and a second surface space having a plurality of electrode pads physically coupled to the semi-conductive devices;
- a conductive elastomer disposed in the connection and in contact with the conductive pad; and
- an adhesive layer deposited on the first surface space of the substrate, said adhesive layer bonding the substrate to the light guide and creating between the conductive pad and the electrode pad through the conductive elastomer.

6. The display module as recited in claim 5, wherein the conductive pad is formed of an Indium-Tin Oxide layer deposited on the back plane of the display, and wherein the conductive pad comprises a gold layer deposited on the Indium-Tin Oxide layer.

\* \* \* \* \*